(12) United States Patent
Hor et al.

(10) Patent No.: US 8,250,253 B2
(45) Date of Patent: Aug. 21, 2012

(54) METHOD, APPARATUS AND SYSTEM FOR REDUCED CHANNEL STARVATION IN A DMA ENGINE

(75) Inventors: Joon Teik Hor, Bayan Lepas (MY); Suryaprasad Kareenahalli, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 12/822,046

(22) Filed: Jun. 23, 2010

(65) Prior Publication Data

US 2011/0320645 A1    Dec. 29, 2011

(51) Int. Cl.
*G06F 13/28* (2006.01)

(52) U.S. Cl. .................. 710/28; 710/6; 710/22; 710/25; 710/116; 710/244; 711/150; 711/151

(58) Field of Classification Search .................. None
See application file for complete search history.

(56) References Cited

U.S. PATENT DOCUMENTS

| | | | | |
|---|---|---|---|---|
| 4,837,677 A * | 6/1989 | Burrus et al. | ................. | 710/308 |
| 5,179,709 A * | 1/1993 | Bailey et al. | ..................... | 710/23 |
| 5,289,583 A * | 2/1994 | Fischer et al. | ................ | 710/241 |
| 5,838,993 A * | 11/1998 | Riley et al. | ....................... | 710/22 |
| 5,864,712 A * | 1/1999 | Carmichael et al. | ............ | 710/20 |
| 5,974,479 A * | 10/1999 | Satoh | ............................... | 710/25 |
| 6,108,743 A * | 8/2000 | Debs et al. | ..................... | 710/240 |
| 6,633,926 B1 * | 10/2003 | Harada et al. | ................... | 710/22 |
| 6,775,717 B1 * | 8/2004 | Tang et al. | ...................... | 710/22 |
| 2003/0088718 A1 * | 5/2003 | Higuchi | ........................... | 710/6 |
| 2005/0050283 A1 * | 3/2005 | Miller et al. | ................... | 711/150 |
| 2006/0004931 A1 * | 1/2006 | Weatherspoon | ................ | 710/22 |
| 2006/0123169 A1 * | 6/2006 | Chai et al. | ..................... | 710/116 |
| 2007/0162642 A1 * | 7/2007 | Tousek | ........................... | 710/22 |
| 2008/0126600 A1 * | 5/2008 | Mitchell et al. | ................. | 710/22 |
| 2008/0147907 A1 * | 6/2008 | Triece et al. | ..................... | 710/22 |
| 2008/0148083 A1 * | 6/2008 | Pesavento et al. | ............ | 713/322 |
| 2009/0125647 A1 * | 5/2009 | Shasha et al. | ................... | 710/22 |
| 2009/0144589 A1 * | 6/2009 | Shasha et al. | ................... | 714/56 |
| 2009/0216917 A1 * | 8/2009 | Shasha et al. | ................... | 710/25 |
| 2010/0064069 A1 * | 3/2010 | Shasha | ........................... | 710/22 |
| 2011/0040920 A1 * | 2/2011 | Chou et al. | .................... | 710/316 |

\* cited by examiner

*Primary Examiner* — Steven Snyder

(74) *Attorney, Agent, or Firm* — Blakely, Sokoloff, Taylor & Zafman LLP

(57) ABSTRACT

Techniques for generating information identifying a next direct memory access (DMA) task to be serviced. In an embodiment, arbitration logic provides a sequence of masking logic to determine, according to a hierarchy of rules, a next task to be serviced by a DMA engine. In certain embodiments, masking logic includes logic to mask information representing pending tasks to be serviced, the masking based on identification of a channel as being a suspended channel and/or a victim channel.

20 Claims, 7 Drawing Sheets

200

A task assigned a priority greater than the reference priority 210

---

A next task in a sequence of tasks assigned the reference priority 220

---

A suspended task assigned a next priority less than the reference priority 230

---

A victim task assigned a next priority less than the reference priority 240

---

A next task in a sequence of tasks assigned a next priority less than the reference priority 250

Descending Order of Hierarchical Rules for Servicing a Task

200

Descending Order of Hierarchical Rules for Servicing a Task

A task assigned a priority greater than the reference priority 210

- - - - - - - - - - - - - - - -

A next task in a sequence of tasks assigned the reference priority 220

- - - - - - - - - - - - - - - -

A suspended task assigned a next priority less than the reference priority 230

- - - - - - - - - - - - - - - -

A victim task assigned a next priority less than the reference priority 240

- - - - - - - - - - - - - - - -

A next task in a sequence of tasks assigned a next priority less than the reference priority 250

FIG. 2

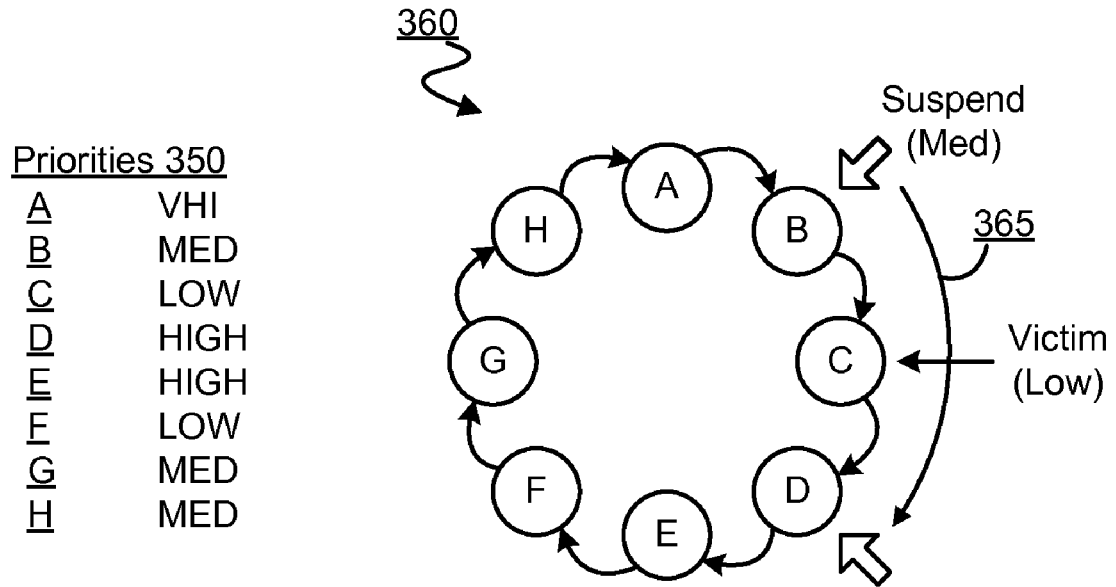
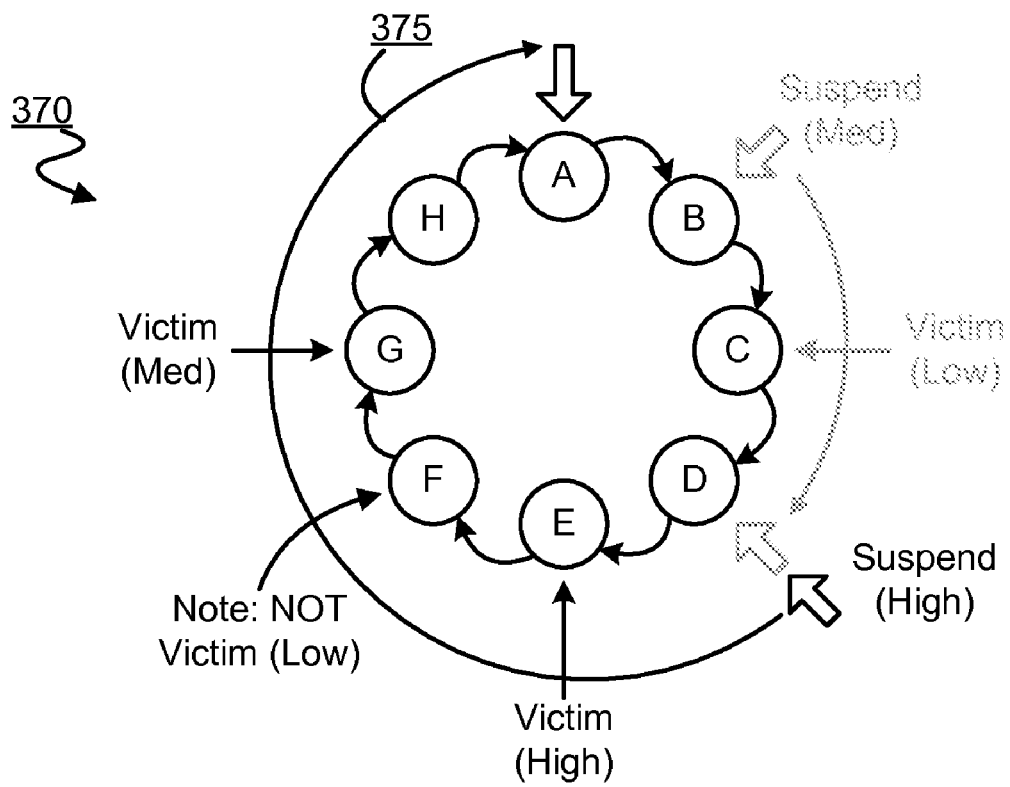
FIG. 3B

Channel Module 400

Source Address 410

Destination Address 420

Transfer Length 430

Channel Priority Setting 440

Suspend State 450

FIG. 4

METHOD, APPARATUS AND SYSTEM FOR REDUCED CHANNEL STARVATION IN A DMA ENGINE

BACKGROUND

1. Technical Field

Embodiments relate generally to direct memory access (DMA) data transfers. More particularly, certain embodiments relate to techniques for providing information identifying a next DMA task to be serviced by a DMA engine.

2. Background Art

Computer platforms often include, or otherwise serve, multiple entities—e.g. processor cores, threads, applications and/or virtual machines—which require data channels for performing respective direct memory access (DMA) tasks on their behalf In allocating memory access resources for such entities, a computer platform may arbitrate among their respective channels—e.g. according to one or more arbitration standards. For example, a computer platform may include or have access to a round robin arbitrator which defines a sequence according to which channels are to be serviced.

In some circumstances, it may be beneficial for the computer platform to recognize a relative greater importance of one data channel with respect to another. Such recognition might be implemented, for example, by assigning respective priorities to one or more channels, where the assigned priorities may be used to arbitrate, from among those channels with tasks which are currently pending, a next channel's task to be serviced.

Unfortunately, a round robin arbitration standard and a channel priority arbitration standard may operate at cross-purposes with one another. Compounding these two arbitration standards with one another may lead to a pending task being denied service for an intolerably long period of time—e.g. where one arbitration standard repeatedly precludes servicing of such pending tasks according to the other standard. Such extended denial of service of a task—referred to herein as task starvation—may affect performance of one or more computer platform operations which are associated with the starved channel.

BRIEF DESCRIPTION OF THE DRAWINGS

The various embodiments of the present invention are illustrated by way of example, and not by way of limitation, in the figures of the accompanying drawings and in which:

FIG. 2 is a hierarchy diagram illustrating select elements of an order of rules for identifying, according to an embodiment, a DMA task to service.

FIGS. 3A and 3B include sequence diagrams illustrating scenarios for identifying, according to certain embodiments, a suspended data channel and/or a victim data channel.

FIG. 4 is a block diagram illustrating select elements of a channel module for storing channel state information according to an embodiment.

DETAILED DESCRIPTION

Figure 1:
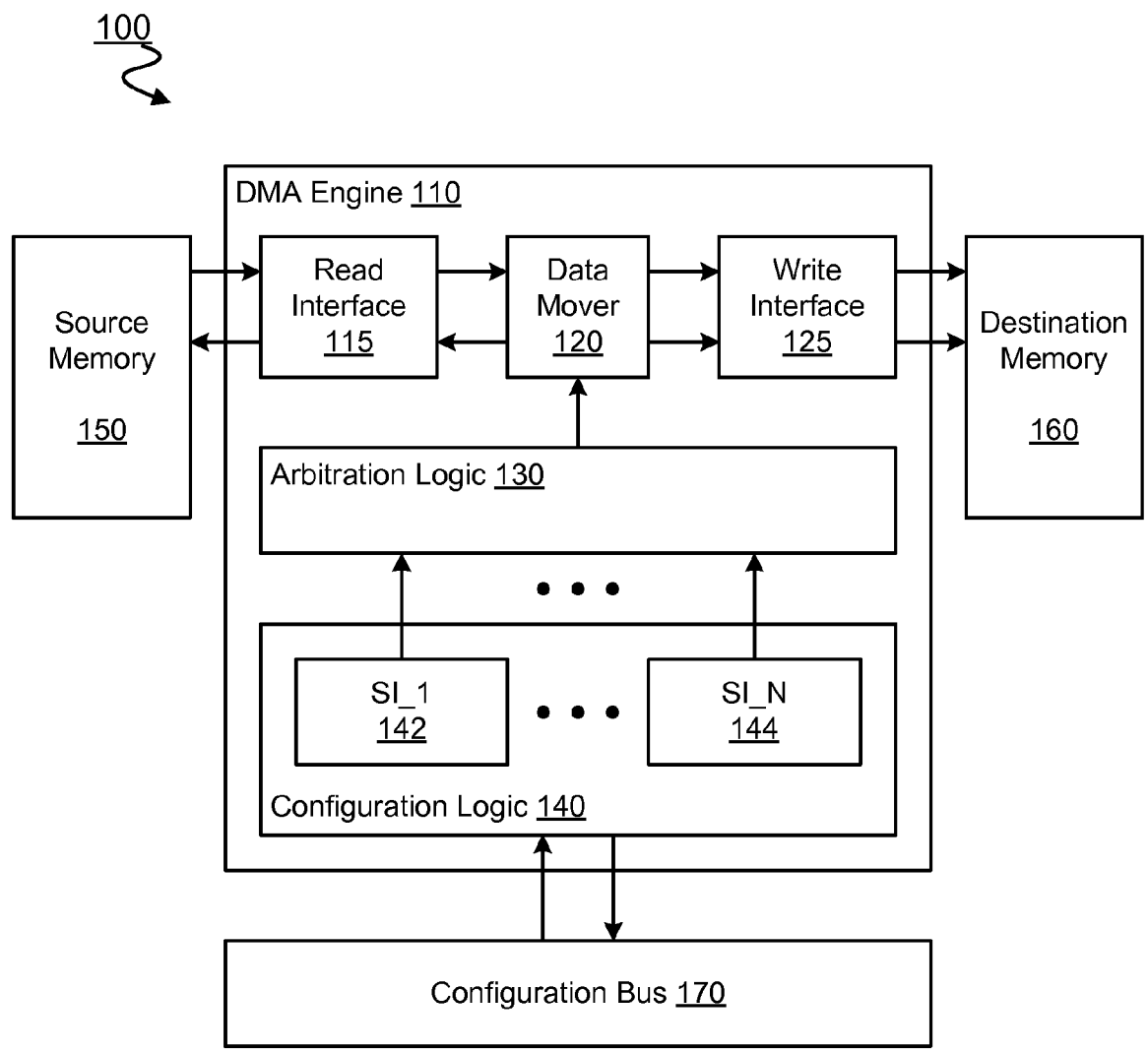
FIG. 1 is a block diagram illustrating select elements of a system to generate, according to an embodiment, information identifying a DMA task to service.

FIG. 1 is a high-level depiction of select elements of the system 100 to generate, according to an embodiment, information identifying a direct memory access (DMA) task to service. In an embodiment, system 100 may include a DMA engine 110 to exchange data from a source memory 150 to a destination memory 160. Source memory 150 may include any of a variety of combinations of data storage hardware including, but not limited to, a floppy disk, optical disk, CD-ROM, and magnetic-optical disk, read-only memory (ROM), random access memory (RAM) such as dynamic RAM (DRAM), magnetic or optical card, and the like. Destination memory 160 may include any of a variety of combinations of such data storage hardware, where the hardware includes data write capability.

DMA engine 110 may reside, for example, on a platform of a computer device including, but not limited to, a desktop personal computer (PC), laptop PC, hand-held device, server, smartphone, etc. In an embodiment, either or both of source memory 150 and destination memory 160 may reside on the same computer platform with DMA engine 110. DMA engine 110 may include logic—e.g. one or more of hardware (e.g. memory, state machines and the like), firmware, software etc.—to variously implement DMA configuration, arbitration, control, communication and/or other techniques described herein. It is understood that certain embodiments may be practiced entirely by DMA engine 110, for example.

In an embodiment, DMA engine 110 includes a read interface 115 coupled to source memory 150 for reading data therefrom. Alternatively or in addition, DMA engine 110 may include a write interface 125 coupled to destination memory 160 to write such data thereto. DMA engine 110 may further include a data mover 120 to facilitate exchanges between read interface 115 and write interface 125. For example, data mover 120 may provide read and write messages to direct read interface 115 and write interface 125, respectively, in their performance of a particular DMA task. Based on such read/write messages, read interface 115 and write interface 125 may variously send respective commands to source memory 150 and destination memory 160, respectively, for directing at least part of a DMA task.

In an embodiment, a single DMA engine 110 may implement a plurality of DMA channels, allowing different DMA tasks per channel to be pending concurrently while DMA engine 110 is operating. By way of illustration and not limitation, DMA engine 110 may include configuration logic 140 to configure channel 1, . . . , channel N for respective DMA data transfers. Configuration logic 140 may store, have access to, or otherwise provide state information SI_1 142, . . . , SI_N 144 associated with, respectively, channel 1, . . . , channel N. Such state information may include information identifying a particular pending request of a respective channel.

Channel 1, . . . , channel N may be variously established and/or assigned to DMA tasks on behalf of one or more respective entities. Such entities may include any of a variety of combinations of one or more applications, threads, processor cores, virtual machines, etc. which can generate, relay or otherwise provide an indication that a channel will be needed for exchanging data via DMA. One or more such entities may reside, for example, on the same computer platform as DMA engine 110.

A configuration bus 170 may be coupled for communication between configuration logic 140 and one or more entities providing configuration requests and/or other information for associating DMA tasks with respective channels. It is understood that different entities may variously exchange respective configuration communications with configuration logic 140 via various respective communication paths.

A single DMA task may be comprised of one or more DMA subtasks, each subtask to transfer a constituent part of the entire data set to be transferred for that DMA task. Individual subtasks of a larger DMA task may be directed by different respective messages exchanged between data mover 120 and either or both of read interface 115 and write interface 125. Once each subtask is successfully serviced, another subtask—of the same data channel or a different data channel—may be serviced, e.g. in a round-robin manner. Alternatively or in addition, each channel may be assigned a respective priority level. For example, DMA engine 110 may support a plurality of M levels of priority, e.g. with '1' being the lowest priority and 'M' the highest priority.

At certain times, DMA engine 110 may evaluate, according to an embodiment, a next DMA subtask to perform. For example, DMA engine 110 may include arbitration logic 130 to determine, according to an order of hierarchical rules, which is the next DMA task to be serviced by data mover 120. Such determinations by arbitration logic 130 may be based, in an embodiment, on channel state information SI_1 142, . . . , SI_N 144. Additionally or alternatively, such determinations may be implemented with a sequence of one or more sets of masking logic of arbitration logic 130, as is discussed herein.

FIG. 2 illustrates select elements of an order 200 of hierarchical rules for servicing a DMA task, according to an embodiment. The order 200 may be implemented in an arbitration scheme in which DMA channels are arbitrated based on a round-robin schema, as well as priorities which are assigned per channel. In an embodiment, arbitration logic 130 implements order 200 in an arbitration scheme. For example, while DMA engine 110 is performing a subtask for a particular DMA task—or after it has completed said subtask—arbitration logic 130 may implement an evaluation round to identify some next DMA task to be serviced (e.g. the same DMA task or some other DMA task), the identifying according to the descending order 200 of hierarchical rules. Evaluation of the next DMA task to be serviced may be based on characteristics of the current DMA task being serviced, such as a priority which is assigned to that DMA task. Accordingly, the currently-serviced DMA task may be referred to as a reference task for an evaluation round, and its assigned priority may be referred to as a reference priority.

Order 200 may include a first rule 210 to identify some task which is assigned a priority that is greater than the reference priority of the reference task. For example, the first rule 210 may be satisfied where, while the reference task is being serviced, another channel is newly established or newly associated with the higher-priority task.

Having newly identified the higher priority task, arbitration logic 130 may signal data mover 120 to complete some pending subtask of the reference subtask, and to begin some first subtask of the newly-identified, higher priority task. The higher priority task may then become the new reference task—and its higher priority the new reference priority—in a subsequent evaluation round for determining a next DMA task to service.

In changing from servicing the reference task to servicing the newly-identified higher priority task, arbitration logic 130 may suspend a servicing of the original reference task. Alternatively or in addition, arbitration logic 130 may effectively skip over one or more other pending DMA tasks that, according to a component round-robin schema of arbitration logic 130, were otherwise due to be serviced in a particular sequence, but for the introduction of the higher priority task.

In order to reduce the risk of data channel starvation, arbitration logic 130 may include logic to keep track of suspended tasks and/or skipped tasks which are passed over in favor of newly-identified higher priority tasks. As used herein, the term "suspended" is used to refer to tasks which have not been completed, but at least one subtask of which has been performed. By contrast a "skipped" task refers to a task for which an active service request is pending, but for which no subtask has yet been performed, where another task is serviced before that task in a manner that is out-of-order with respect to some previously expected service sequence. Arbitration logic 130 may identify one or more skipped tasks as victim tasks— where each such task is recognized as a particular type of victim of delay due to some change in an order of task servicing. Various techniques for identifying a victim channel according to different embodiments are addressed elsewhere in this discussion.

Order 200 may further include a second rule 220 to identify a next task in a sequence of tasks assigned the reference priority. Rule 220 may be satisfied, for example, where the reference priority is the highest priority of all pending requests, and there remains some other pending task assigned to the reference priority. A task may, for example, be identified according to rule 220 as a result of that task being the next task after the reference task in a round robin sequence which is assigned the reference priority.

Order 200 may further include a third rule 230 to identify a suspended task assigned a next priority less than the reference priority. Rule 230 may be satisfied, for example, where all previously pending tasks assigned the reference priority have been serviced, and the relatively highest priority which is assigned to any of the remaining pending tasks is assigned to a suspended task.

Order 200 may further include a fourth rule 240 to identify a skipped task assigned a next priority less than the reference priority. Rule 240 may be satisfied, for example, where the relatively highest priority which is assigned to any of the remaining pending tasks is not assigned to any suspended tasks, but rather is assigned to a task which is identified as a victim task.

Order 200 may further include a fifth rule 250 to identify a next task in a sequence of tasks assigned a next priority less than the reference priority. Rule 250 may be satisfied, for example, where the relatively highest priority which is assigned to any of the remaining pending tasks is not assigned to any suspended task or victim task. A task may, for example, be identified according to rule 250 as a result of that task being the next task assigned to the relatively highest priority which follows the reference task in a round robin sequence.

As used herein, the ordinals "first", "second", "third", etc. are used with reference to the rules of order 200 only to describe an order of rules 210-250 with respect to one another. It is understood that order 200 may include one or more additional rules before and/or after any one of rules 210-250.

Figure 3A:
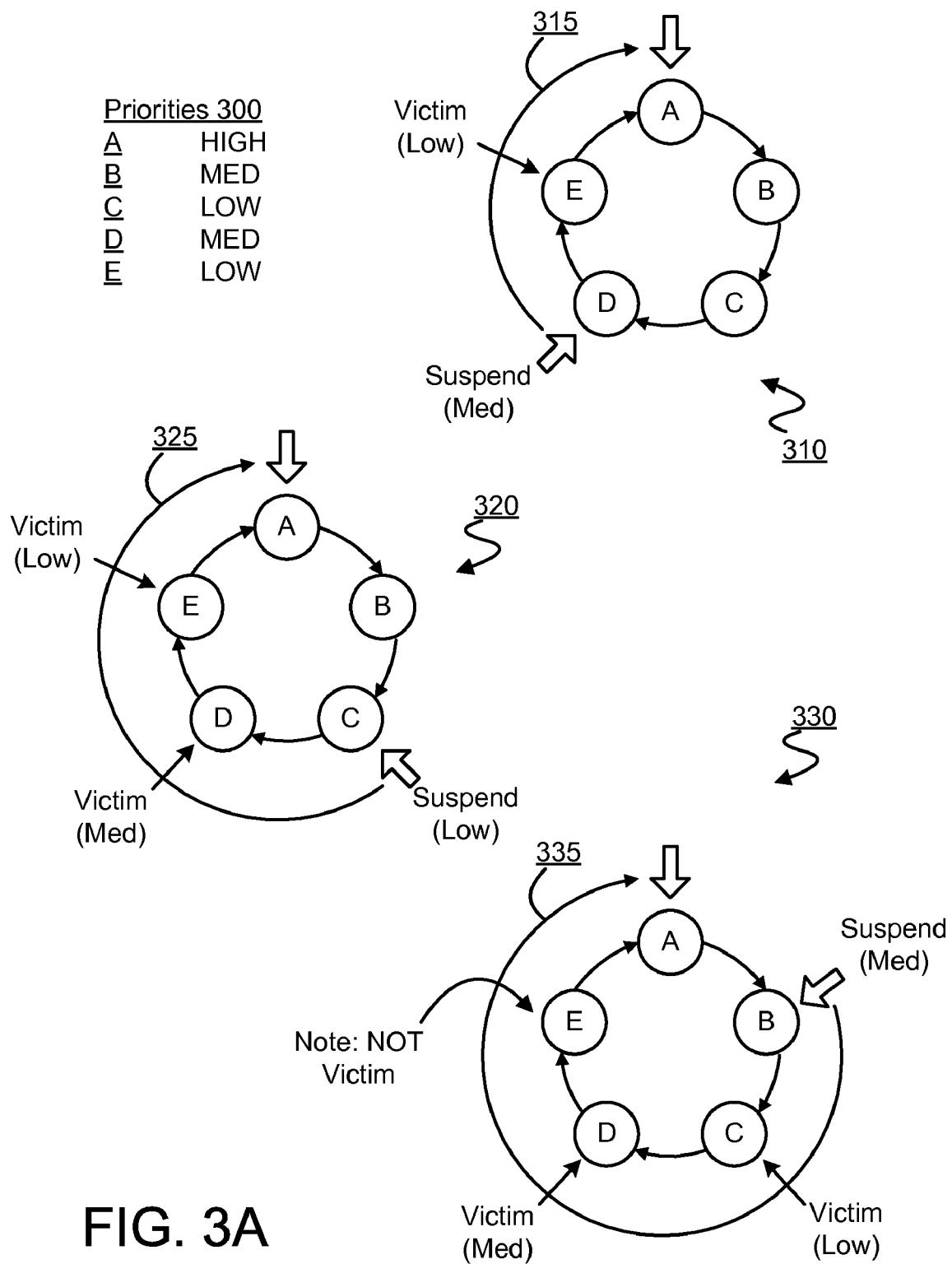

FIG. 3A shows elements of illustrative scenarios 310, 320, 330 in which suspended tasks and victim tasks are variously determined for use in identifying, in an embodiment, a DMA task to be serviced. Suspended tasks and victim tasks may be identified and/or tracked by arbitration logic 130 which may, for example, include or have access to a round robin arbiter for arbitrating among a plurality of channels. Additionally, arbitration logic 130 may support a plurality of priorities which are variously assigned to respective ones of the arbitrated channels.

During the servicing of a given task, an evaluation process may, according to an embodiment, identify a next task to be serviced. In response to the identifying the next task to be serviced, the arbitration logic may, in an embodiment, determine that the currently-serviced task is to be suspended. Additionally or alternatively, the arbitration logic may determine that one or more other pending tasks may need to be skipped, wherein a skipped task (or tasks) is not serviced according to a previously expected order of servicing currently pending tasks. In various embodiments, different criteria may be applied in identifying a skipped tasks as a victim task.

For the sake of illustrating certain features of various embodiments, scenarios 310, 320, 330 relate to arbitration of a set of channels A, B, C, D and E, which a round robin arbiter arbitrates according to a sequence A→B→C→D→E, which then returns again to A. Moreover, the round robin arbitration may be compounded with arbitration of the channels by a priority arbiter. In the illustrative scenarios 310, 320, 330, the priority arbitration supports three priorities—HIGH (highest priority), MED (intermediate priority) and LOW (lowest priority)—where channel A is assigned, 300, HIGH priority, channels B and D are each assigned MED priority and channels C and E are assigned LOW priority. It is understood that a scenario may vary from any of scenarios 310, 320, 330—e.g. according to the number of channels, the number of supported priorities, the assignment of channels to respective priorities, the number and/or distribution of pending tasks and/or the skipping from any one task to any other task.

In scenario 310, arbitration logic performs an evaluation round to identify, while a task for channel D is being serviced, a next task to service. Such an evaluation round may be according to the order 200, for example, where channel D is the reference task and the priority MED assigned to channel D is the reference priority for identifying the next task.

The evaluation round for scenario 310 may newly detect that a task has been assigned to channel A, which is assigned a priority HIGH which is higher than the reference priority. Based on the higher priority of channel A with respect to the reference priority, the reference task for channel D may be identified as a task to be suspended.

The identified suspended task D and the identified next task A to service may define a portion 315 of the round robin sequence to be skipped in moving to the servicing of the next task A. Depending on the location in the round robin sequence of the reference task and the identified next task, portion 315 may span one or more pending tasks which are to be skipped for servicing after the identified next task for channel A is serviced.

Since channel E is a skipped channel on the sequence portion 315, it is a candidate which may be identified as a victim channel. In an embodiment, channel E may be identified as a victim channel based in part on there being a pending task for channel E during the evaluation round for scenario 310. Moreover, channel E may be identified as a victim channel based in part on there being no preceding pending task in the sequence portion 315 which is assigned the same priority as that of channel E. That is to say, in an embodiment, a round of identifying any victim tasks in a portion of a round robin sequence may only identify one pending task per priority level as the sole victim task for that priority level.

In certain embodiments, during a given round to identify any victim channels in a sequence portion, a given channel assigned to some priority may be prevented from being identified as a victim channel for that priority if a different channel assigned to that same priority has not been serviced since also being identified as a victim channel—e.g. by a previous round to identify any victim channels in some sequence portion.

In scenario 320, arbitration logic performs an evaluation round to identify, while a task for channel C is being serviced, a next task to service. Such an evaluation round may be according to the order 200, for example, where channel C is the reference task and the priority LOW assigned to channel C is the reference priority for identifying the next task.

The evaluation round for scenario 320 may newly detect that a task has been assigned to channel A, which is assigned a priority HIGH which is higher than the reference priority. Based on the higher priority of channel A with respect to the reference priority, the reference task for channel C may be identified as a task to be suspended.

The identified suspended task C and the identified next task A to service may define a portion 325 of the round robin sequence to be skipped in moving to the servicing of the next task A. In the case of scenario 320, sequence portion 325 includes skipped channels D and E, which may therefore be candidates for being identified as victim tasks.

Since there is no preceding pending task in the sequence portion 325 which is assigned to its MED priority, skipped channel D may be identified as a victim channel, assuming that, at the time, there is an active request to service a pending task for channel D. In an embodiment, the round of identifying any victim channels for portion 325 may identify one victim channel at most for each priority level which is assigned to a skipped channel in portion 325.

In an embodiment, channel E may be identified as a victim channel for the priority LOW in portion 325, assuming that, at the time, there is an active request to service a pending task for channel E. However, in an alternate embodiment, identification of any victim channels in sequence 325 may exclude identification of any victim channel for the priority level to which the suspended channel is assigned.

In scenario 330, arbitration logic performs an evaluation round to identify, while a task for channel B is being serviced, a next task to service. Such an evaluation round may be according to the order 200, for example, where channel B is the reference task and the priority MED assigned to channel B is the reference priority for identifying the next task.

The evaluation round for scenario 330 may newly detect that a task has been assigned to channel A, which is assigned a priority HIGH which is higher than the reference priority. Based on the higher priority of channel A with respect to the reference priority, the reference task for channel B may be identified as a task to be suspended.

The reference task B and the identified next task A to service may define a portion 335 of the round robin sequence to be skipped in moving to the servicing of the next task A. In the case of scenario 330, sequence portion 335 includes skipped channels C, D and E, which may therefore be candidates for being identified as victim tasks.

Since there is no preceding pending task in the sequence portion 335 which is assigned to its LOW priority, channel C may be identified as a victim channel, assuming that, at the time, there is an active request to service a pending task for channel C. Identification of channel C as a victim channel for its assigned LOW priority may exhaust the possibility that the later LOW priority channel E along portion 335 might be identified as a victim channel for the LOW priority.

Since there is no preceding pending task in the sequence portion 335 which is assigned to its MED priority, skipped channel D may be identified as a victim channel, assuming that, at the time, there is an active request to service a pending task for channel D. In an alternate embodiment, the round of identifying any victim channels for portion 335 may not identify channel D as a victim channel, since it is assigned the same reference priority of the suspended channel B.

FIG. 3B shows elements of illustrative scenarios 360, 370 in which suspended tasks and victim tasks are variously determined for use in identifying, in an embodiment, a DMA task to be serviced. Suspended tasks and victim tasks may be identified and/or tracked by arbitration logic 130 which may, for example, include or have access to a round robin arbiter for arbitrating among a plurality of channels. Additionally, arbitration logic 130 may support a plurality of priorities which are variously assigned to respective ones of the arbitrated channels.

For the sake of illustrating certain features of various embodiments, scenarios 360, 370 relate to arbitration of a set of channels A through H, which a round robin arbiter arbitrates according to a sequence A→B→C→D→E→F→G→H, which then returns again to A. Moreover, the round robin arbitration may be compounded with arbitration of the channels by a priority arbiter. In the illustrative scenarios 360, 370, the priority arbitration supports four priorities—VHI (highest priority), HIGH (second highest priority), MED (second lowest priority) and LOW (lowest priority)—where, 350, channel A is assigned VHI priority, channels D and E are each assigned HIGH priority, channels B, G an H are assigned MED priority, and channels C and F are assigned LOW priority. It is understood that each of scenarios 360, 370 could be different—e.g. according to the number of channels, the number of supported priorities, the assignment of channels to respective priorities, the number and/or distribution of pending tasks and/or the skipping from any one task to any other task.

In scenario 360, arbitration logic performs an evaluation round to identify, while a task for channel B is being serviced, a next task to service. Such an evaluation round may be according to the order 200, for example, where channel B is the reference task and the priority MED assigned to channel B is the reference priority for identifying the next task.

The evaluation round for scenario 360 may newly detect that a task has been assigned to channel D, which is assigned a priority HIGH which is higher than the reference priority. Based on the higher priority of channel D with respect to the reference priority, the reference task for channel B may be identified as a task to be suspended.

The identified suspended task B and the identified next task D to service may define a portion 365 of the round robin sequence including channel C. Since there is no preceding pending task in the sequence portion 365 which is assigned to its LOW priority, channel C may be identified as a victim channel, assuming that, at the time, there is an active request to service a pending task for channel C.

In scenario 370, the task for channel D, previously identified in scenario 360 as the next task to service, has become the reference task, and its assigned HIGH priority has become the reference priority. Arbitration logic may perform an evaluation round to identify, while a task for channel D is being serviced, a next task to service.

The evaluation round for scenario 370 may newly detect that a task of channel A, which is assigned priority VHI, higher than the current reference priority HI. Based on the higher priority of channel A with respect to the reference priority, the reference task for channel D may be identified as another task to be suspended—in this case, while the task for channel B remains suspended. Multiple suspended tasks may be tracked by the arbitration logic, providing an arbitration scheme that allows for nested suspend/resume task servicing. In the case of scenarios 360, 370, the task for channel D may be suspended after the suspension of the comparatively lower priority task for channel B. In an embodiment where arbitration logic arbitrates channel tasks according to order 200, servicing of the later suspended task for channel D may resume before servicing is resumed for the prior suspended, lower priority task for channel B.

The subsequent reference task D and the identified next task A to service may define a portion 375 of the round robin sequence including skipped channels E, F, G and H. As the first skipped channel in portion 375 which is assigned to priority HIGH, channel E may be marked as a victim channel—e.g. assuming there is a pending request to service a task for channel E, and further assuming that there is no other HIGH priority channel which is currently identified as a victim channel due to a previous evaluation round. In an alternate embodiment, despite such assumptions, channel E may nevertheless remain a non-victim channel—e.g. due to the current suspended status of a channel—i.e. channel D—which shares the same priority as channel E.

As the first skipped channel in portion 375 which is assigned to priority MED, channel G may be marked as a victim channel—e.g. assuming there is a pending request to service a task for channel G, and further assuming that there is no other MED priority channel which is currently identified as a victim channel due to a previous evaluation round. In an alternate embodiment, despite such assumptions, channel G may nevertheless remain a non-victim channel—e.g. due to the current suspended status of a channel—i.e. channel B—which shares the same priority as channel G.

In an embodiment, the identification of channel C as a victim channel for the priority LOW will prevent channel F from being identified as a victim channel. Similarly, the identification of channel G as a victim channel for the priority MED will prevent channel H from being identified as a victim channel.

FIG. 4 illustrates select elements of a channel module 400 to provide state information for identifying, according to an embodiment, a next DMA task to be serviced by a DMA engine. Channel module 400 may include, or otherwise provide, one of the sets of state information SI_1 142, . . . , SI_N 144, for example.

In an embodiment, configuration logic 140 may include, for each of a plurality of channels, a respective channel module of the type illustrated by channel module 400, each channel module storing state information describing a respective channel. By way of illustration and not limitation, channel module 400 may contain channel specific data including, for example, a source address 410 identifying a memory location in a data source from which data is to be read for a next subtask of a DMA task of the respective channel. Alternatively or in addition, channel module 400 may include a destination address 420 identifying a memory location in a data destination to which data is to be written for a next subtask of a DMA task of the respective channel. Alternatively or in addition, channel module 400 may include a transfer length 430 identifying an amount of data to be transferred in a next subtask of a DMA task of the respective channel. Alternatively or in addition, channel module 400 may include a channel priority setting 440 identifying a priority assigned to the respective channel. Alternatively or in addition, channel module 400 may include a suspend state 450 identifying whether a pending DMA task for the respective channel is currently in a suspend state.

In various embodiments, channel module 400 may also store victim state information (not shown) identifying whether the respective channel has a task which is a victim task. State information in channel module 400 may be accessed by—e.g. read from and/or written to—arbitration logic to implement techniques for determining a next DMA task to be serviced by a DMA engine.

Figure 5:
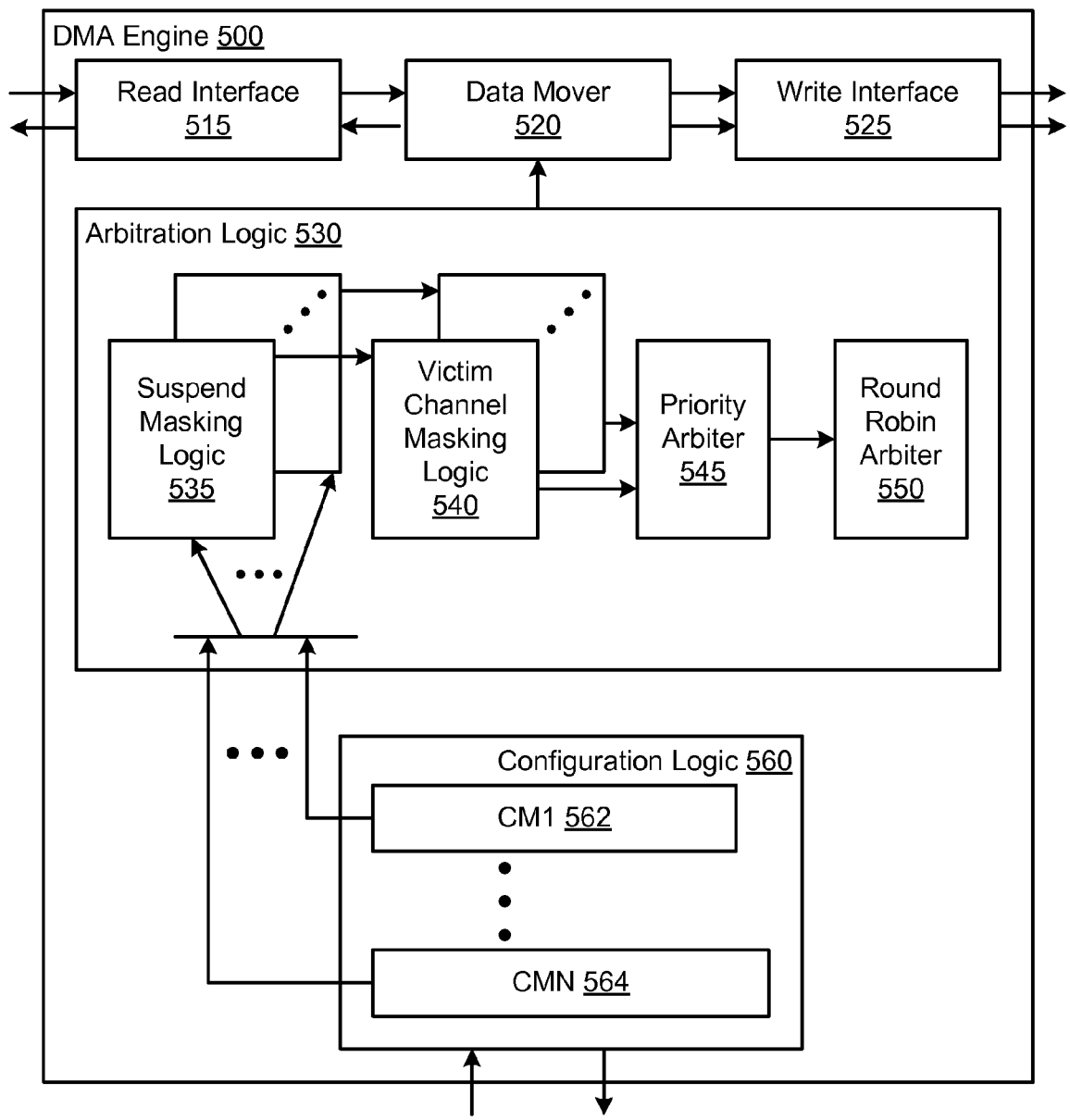
FIG. 5 is a block diagram illustrating select elements of a DMA engine to generate, according to an embodiment, information identifying a DMA task to service.

FIG. 5 illustrates select elements of a DMA engine 500 to generate, according to an embodiment, information identifying a DMA task to service. DMA engine 500 may include some or all of the features of DMA engine 110, for example.

In an embodiment, DMA engine 500 includes a read interface 515 for reading DMA data from a source memory, and a write interface 525 for writing DMA data to a destination memory. DMA engine 500 may further include a data mover 520 to facilitate exchanges between read interface 515 and write interface 525. DMA engine 500 may also include, or have access to, arbitration logic 530 to determine, according to an embodiment, information identifying a DMA task to service, the information to be provided to data mover 520. It is understood that various embodiments may be implemented entirely by arbitration logic 530, for example.

Additionally, DMA engine 500 may include configuration logic 560 to variously configure a plurality of channels—e.g. channel 1, ..., channel N—for respective DMA data transfers. By way of illustration and not limitation, configuration logic may include channel modules CM1 562, ..., CMN 564, each storing state information describing a respective one of channel 1, ..., channel N. Some or all of channel modules CM1 562, ..., CMN 564 may store channel specific state information such as that of channel module 400.

Arbitration logic 530 may include a round robin arbiter 550 to arbitrate among channel 1, ..., channel N according to a particular round robin sequence. Additionally or alternatively, arbitration logic 530 may further include a priority arbiter 545 to compound arbitration by round robin arbiter 550 with arbitration according to a plurality of priorities which are variously assigned to some or all of channel 1, ..., channel N. Arbitration by priority arbiter 545 and round robin arbiter 550 may be based on task request information—which may include information identifying a task request—which has been processed at least in part by masking logic of arbitration logic 530—e.g. by suspend masking logic 535 and/or victim channel masking logic 540 of arbitration logic 530.

Suspend masking logic 535 may include logic to generate, or otherwise access, information identifying a channel's task which has been or is to be suspended—e.g. information generated in an evaluation round such as any of those discussed herein with respect to FIGS. 3A and 3B. For example, information identifying a suspended task may be generated by, or provided to, suspend masking logic 535 during an evaluation round. Alternatively or in addition, such information identifying a suspended task may be directly or indirectly provided to suspend masking logic 535 by other logic of arbitration logic 530. In an embodiment, the identification of a channel's task as being a suspended task may be represented as suspend state information in one of the channel modules CM1 562, ..., CMN 564 which corresponds to the channel of the suspended task. Suspend masking logic 535 may, for example, identify a suspended task based on such suspend state information of channel modules CM1 562, ..., CMN 564.

Suspend masking logic 535 may include suspend mask components for each of a plurality of priority levels supported by priority arbiter 545, each suspend mask component to receive from configuration logic 560 task request information for any pending tasks which are assigned to the respective priority. Based on the state information of channel modules CM1 562, ..., CMN 564, configuration logic 560 may provide to suspend masking logic 535 task request information describing any pending requests of channel 1, ..., channel N.

For each of the supported priorities, suspend masking logic 535 may mask task request information of those pending tasks assigned to the priority which are not identified as a suspended task, where one task assigned to the priority is identified as a suspended task. The masking of such task request information may prevent certain pending requests for non-suspended tasks from being indicated to other elements of arbitration logic 530—e.g. to victim channel logic 540. In an embodiment, suspend masking logic 535 may avoid masking any pending requests assigned to a particular priority—e.g. where no pending task assigned to that priority is identified as a suspended task.

Victim channel masking logic 540 may include logic to generate, or otherwise access, information identifying as victim task certain channel tasks which have been or are to be skipped—e.g. information generated in an evaluation round such as any of those discussed herein with respect to FIGS. 3A and 3B. For example, information identifying a victim task may be generated by, or provided to, victim channel masking logic 540 during an evaluation round. Alternatively or in addition, such information identifying a victim task may be directly or indirectly provided victim channel masking logic 540 by other logic of arbitration logic 530. In an embodiment, the identification of a channel's task as being a victim task may be represented as victim state information in one of the channel modules CM1 562, ..., CMN 564 which corresponds to the channel of the victim task. Victim channel masking logic 540 may, for example, identify a victim task based on such victim state information of channel modules CM1 562, ..., CMN 564.

Victim channel masking logic 540 may include victim mask components for each of a plurality of priority levels supported by priority arbiter 545, each victim mask component to receive from suspend masking logic 535 processed task request information for any pending tasks which are assigned to the respective priority. For each of the supported priorities, victim channel masking logic 540 may selectively mask the received task request information of those pending tasks assigned to the priority which are not identified as a victim task, where one task assigned to the priority is identified as a victim task. The masking of such task request information may prevent certain pending requests for non-victim tasks from being indicated to other elements of arbitration logic 530—e.g. to priority arbiter 545 and/or round robin arbiter 550. In an embodiment, victim channel masking logic 540 may avoid masking any pending requests assigned to a particular priority—e.g. where no pending task assigned to that priority is identified as a victim task.

With the masked task request information from victim channel masking logic 540, priority arbiter 545 may arbitrate among any pending tasks indicated by the task request information according to their respective priorities. In an embodiment, priority arbiter 545 may identify the relatively highest priority among those priorities to which the pending requests indicated by victim channel masking logic 540 have been assigned. Priority arbiter 545 may then identify all of those pending requests which are assigned to that relatively highest priority and which are also indicated by the task request information from victim channel masking logic 540.

Priority arbiter 545 may then provide to round robin arbiter 550 information which indicates the one or more pending, not-yet-masked, task requests which are associated with that relatively highest priority. Round robin 550 may then identify one of the tasks indicated by priority arbiter 545 as being the next task to be serviced by data mover 520. In an embodiment, the identified task is the task which is closest to the reference task along a portion of a round robin sequence which begins with the reference task. Round robin 550 may then directly or indirectly indicate to data mover 520 the next task to be serviced.

As an illustration, operation of arbitration logic 530 is described below in relation to the scenario 310. In an embodiment, suspend masking logic 535 may process, for each priority indicated by state information describing pending task requests, a respective vector identifying the channels which are assigned to that priority and which have a pending task which is not a suspended task.

Suspend masking logic 535 may provide to victim channel masking logic 540, for each priority assigned to a pending task, a respective output vector identifying the channels which are assigned to that priority and which have a pending task request which is not a suspended task. Based on the information from suspend masking logic 535, victim channel masking logic 540 may provide to priority arbiter 545, for each priority assigned to a pending task, a respective output vector identifying the channels which were indicated by suspend masking logic 535 and which are either victim tasks or are assigned to a priority which is not also assigned to any victim task. Priority arbiter 545 may then select that vector provided by victim channel masking logic 540 which is associated with the relatively highest priority indicated by the (non-zero) vectors. This relatively highest priority, non-zero vector may then be provided to round robin arbiter 550, which will identify from among the one or more channels indicted by the vector the channel which follows most closely behind the reference channel along a portion of a round robin sequence.

Tables 1.0 through 1.4 indicate the sequence of values which are variously received, processed and output by suspend masking logic 535, victim channel masking logic 540, priority arbiter 545 and round robin arbiter 550 in the course of DMA engine 500 servicing the pending tasks of channels A through E.

Note that in Table 1.0, suspend masking logic 535 has only masked vector bits for a medium priority vector, since newly suspended channel D is assigned the medium priority. This indicates that there are no other previously suspended tasks during the evaluation round or Table 1.0. Also in Table 1.0, victim channel masking logic 540 has masked a vector bit for channel C in the low priority vector, since low priority channel E is identified as a victim channel for the low priority. Priority arbiter 545 selects the high priority vectors since it is the highest priority vector with any bits representing a pending request. Round robin arbiter 550 may then identify a servicing of a task for channel A, since it is the only channel indicated in the vector output by priority arbiter 545.

TABLE 1.1

| | Channel A Task Completed | | | | |
|---|---|---|---|---|---|
| | Suspend Masking Logic Input (A, B, C, D, E) | Suspend Masking Logic Output (A, B, C, D, E) | Victim Channel Masking Logic Output (A, B, C, D, E) | Priority Arbiter Output (A, B, C, D, E) | Round Robin Arbiter |
| Priority High | 0, 0, 0, 0, 0 | 0, 0, 0, 0, 0 | 0, 0, 0, 0, 0 | 0, 0, 0, 1, 0 | D |
| Priority Medium | 0, 1, 0, 1, 0 | 0, 0, 0, 1, 0 | 0, 0, 0, 1, 0 | | |
| Priority Low | 0, 0, 1, 0, 1 | 0, 0, 1, 0, 1 | 0, 0, 0, 0, 1 | | |

Note that in Table 1.1, servicing of the task for channel A is completed, so no pending requests are indicated at the high priority. Suspend masking logic 535 masks the bit for channel B, since channel B is assigned the same priority as suspended channel D. Also in Table 1.1, victim channel masking logic 540 has again masked a vector bit for channel C in the low priority vector, since low priority channel E is identified as a victim channel for the low priority. Priority arbiter 545 selects the medium priority vector since it is the highest priority vector with any bits representing a pending request. Round robin arbiter 550 may then identify a servicing of a task for channel D, since it is the only channel indicated in the vector output by priority arbiter 545. Channel D is thus resumed, and suspend masking logic will no longer mask the bit associated with channel B. A medium priority vector (0, 1, 0, 1, 0) is thereafter provided to the round robin arbiter. As a result, starting with the newly-resumed channel D task, respective subtasks for channels D and B will be alternately serviced, since they are the only channels in the round-robin sequence which are assigned to this relatively highest priority of all pending tasks. For this illustrative case, it is assumed that the task for channel D completes before the task for channel B.

TABLE 1.0

| | Channel A Task Introduced | | | | |
|---|---|---|---|---|---|
| | Suspend Masking Logic Input (A, B, C, D, E) | Suspend Masking Logic Output (A, B, C, D, E) | Victim Channel Masking Logic Output (A, B, C, D, E) | Priority Arbiter Output (A, B, C, D, E) | Round Robin Arbiter |
| Priority High | 1, 0, 0, 0, 0 | 1, 0, 0, 0, 0 | 1, 0, 0, 0, 0 | 1, 0, 0, 0, 0 | A |
| Priority Medium | 0, 1, 0, 1, 0 | 0, 0, 0, 1, 0 | 0, 0, 0, 1, 0 | | |
| Priority Low | 0, 0, 1, 0, 1 | 0, 0, 1, 0, 1 | 0, 0, 0, 0, 1 | | |

TABLE 1.2

Channel D Task Completed

|  | Suspend Masking Logic Input (A, B, C, D, E) | Suspend Masking Logic Output (A, B, C, D, E) | Victim Channel Masking Logic Output (A, B, C, D, E) | Priority Arbiter Output (A, B, C, D, E) | Round Robin Arbiter |
|---|---|---|---|---|---|
| Priority High | 0, 0, 0, 0, 0 | 0, 0, 0, 0, 0 | 0, 0, 0, 0, 0 | 0, 1, 0, 0, 0 | B |
| Priority Medium | 0, 1, 0, 0, 0 | 0, 1, 0, 0, 0 | 0, 1, 0, 0, 0 |  |  |
| Priority Low | 0, 0, 1, 0, 1 | 0, 0, 1, 0, 1 | 0, 0, 0, 0, 1 |  |  |

Note that in Table 1.2, servicing of the task for channel D is completed, so only a pending request for channel B is indicated at the medium priority. Suspend masking logic 535 does not mask the bit for channels B or C, since there are no currently suspended tasks assigned to either the low or medium priorities. Also in Table 1.2, victim channel masking logic 540 has again masked a vector bit for channel C in the low priority vector, since low priority channel E is identified as a victim channel for the low priority. Priority arbiter 545 selects the medium priority vector since it is the highest priority vector with any bits representing a pending request. Round robin arbiter 550 may then identify a servicing of a task for channel B, since it is the only channel indicated in the vector output by priority arbiter 545.

TABLE 1.3

Channel B Task Completed

|  | Suspend Masking Logic Input (A, B, C, D, E) | Suspend Masking Logic Output (A, B, C, D, E) | Victim Channel Masking Logic Output (A, B, C, D, E) | Priority Arbiter Output (A, B, C, D, E) | Round Robin Arbiter |
|---|---|---|---|---|---|
| Priority High | 0, 0, 0, 0, 0 | 0, 0, 0, 0, 0 | 0, 0, 0, 0, 0 | 0, 0, 0, 0, 1 | E |
| Priority Medium | 0, 0, 0, 0, 0 | 0, 0, 0, 0, 0 | 0, 0, 0, 0, 0 |  |  |
| Priority Low | 0, 0, 1, 0, 1 | 0, 0, 1, 0, 1 | 0, 0, 0, 0, 1 |  |  |

Note that in Table 1.3, servicing of the task for channel B is completed, so no pending requests are indicated at the medium priority. Suspend masking logic 535 does not mask the bit for channel C, since there is no currently suspended task assigned to the medium priority. However, victim channel masking logic 540 again masks the vector bit for channel C in the low priority vector, since low priority channel E remains a victim channel for the low priority. Priority arbiter 545 selects the low priority vector since it is the highest priority vector with any bits representing a pending request. Round robin arbiter 550 may then identify a servicing of a task for channel E, since it is the only channel indicated in the vector output by priority arbiter 545.

Servicing of channel E is thus initiated, and victim channel masking logic will no longer mask the bit associated with channel C. A low priority vector (0, 0, 1, 0, 1) is provided to the round robin arbiter, and starting with the newly-initiated channel E task, respective subtasks for channels E and C will be alternately serviced, since they are the only channels in the round-robin sequence which are assigned to this relatively highest priority of all pending tasks. For this illustrative case, it is assumed that the task for channel E completes before the task for channel C.

TABLE 1.4

Channel E Task Completed

|  | Suspend Masking Logic Input (A, B, C, D, E) | Suspend Masking Logic Output (A, B, C, D, E) | Victim Channel Masking Logic Output (A, B, C, D, E) | Priority Arbiter Output (A, B, C, D, E) | Round Robin Arbiter |
|---|---|---|---|---|---|
| Priority High | 0, 0, 0, 0, 0 | 0, 0, 0, 0, 0 | 0, 0, 0, 0, 0 | 0, 0, 1, 0, 0 | C |
| Priority Medium | 0, 0, 0, 0, 0 | 0, 0, 0, 0, 0 | 0, 0, 0, 0, 0 |  |  |
| Priority Low | 0, 0, 1, 0, 0 | 0, 0, 1, 0, 0 | 0, 0, 1, 0, 0 |  |  |

Note that in Table 1.4, servicing of the task for channel E is completed, so no suspended or victim channels are pending for the low priority. Suspend masking logic 535 and victim channel masking logic 540 both pass a vector bit for channel C in a low priority vector. Priority arbiter 545 selects the low priority vector since it is the highest priority vector with any bits representing a pending request. Round robin arbiter 550 may then identify a servicing of a task for channel C, since it is the only channel indicated in the vector output by priority arbiter 545. The resulting sequence of serviced tasks illustrated by Tables 1.0 through 1.4 is consistent with sequential application of the order 200 of hierarchical rules.

Figure 6:
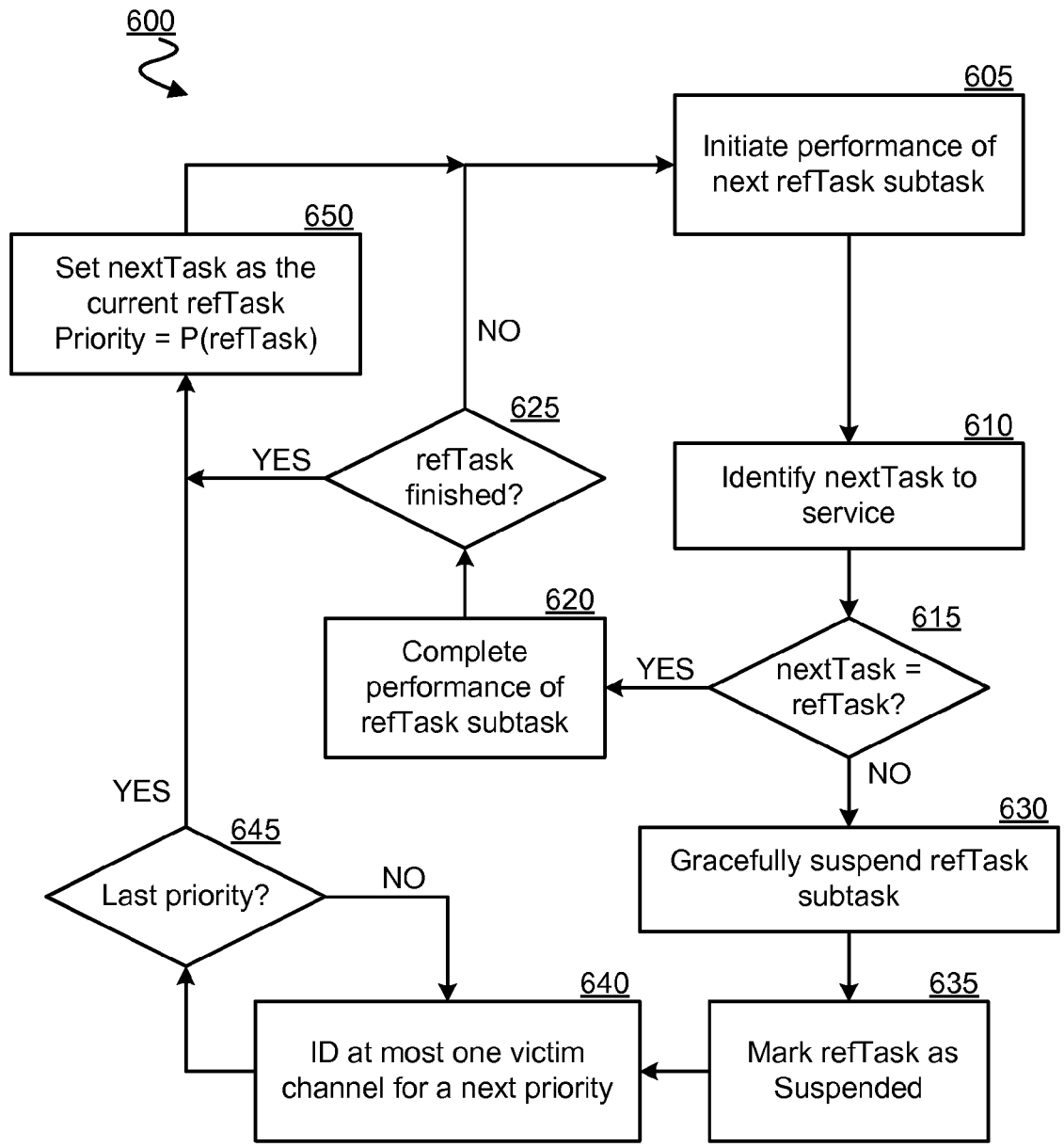
FIG. 6 is a sequence diagram illustrating select elements of a method for suspending, according to an embodiment, a DMA task.

FIG. 6 illustrates select elements of a method 600 for suspending a DMA task, according to an embodiment. Method 600 may be performed, for example, by DMA engine 500. Method 600 may include, at 605, initiating performance of a next subtask of a reference task (refTask) which is currently being serviced by the data mover of a DMA engine. During performance of the current subtask for refTask, a next task to be serviced (nextTask) is identified, at 610. Identification of a next task to be serviced may, for example, be performed by arbitration logic 530 implementing the order 200 of hierarchical rules.

At 615, a determination is made as to whether the identified nextTask is the same as the refTask which is currently being serviced. In response to determining that nextTask is the same as refTask, method 600 may, at 620, complete performance of the current subtask for refTask—e.g. without interrupting any preparations to continue on to performing a next subtask for refTask. Upon completion of the subtask for refTask, another determination is made, at 625, as to whether the servicing of refTask is complete—e.g. that all of the data transfers for refTask are complete. If servicing of refTask is not complete, then method 600 returns to performing a next refTask subtask, at 605.

If servicing of refTask is complete, then at 650, nextTask is set to be the new refTask, where the priority assigned to the new refTask is set to be the reference priority for a subsequent iteration of identifying a next task to service. Performance of a first subtask of the newly assigned refTask may then be initiated, at 605.

If at 615, nextTask is determined to be different from refTask, then method 600 may, at 630, gracefully suspend servicing of refTask. The term 'gracefully' here means that any pending read requests of the currently performed subtask will be completed and any data already in the DMA system will be written out to the destination memory first before that channel is suspended. After gracefully suspending the current subtask, refTask may be marked as a suspended task, at 635.

Suspend masking logic may generate or receive data identifying refTask as a suspended task. Additionally or alternatively, a channel module corresponding to the channel for refTask may store suspend state information identifying refTask as a suspended task. In an embodiment, a victim channel may be identified, at 640, for a particular priority of a pending request which will be skipped in servicing next-Task. There may be only one victim channel per priority level which is assigned to a pending request, except for absolute highest priority, which may never be skipped. Victim channel identifiers may be considered as write once flags. Such a flag may only be cleared when its respective victim channel is serviced.

Method 600 may iteratively determine, at 645, whether each priority assigned to a pending request have been evaluated to identify any victim channel thereof Once all priorities assigned to pending task requests are considered, then at 650, nextTask is set to be the new refTask, where the priority assigned to the new refTask is set to be the reference priority for a subsequent iteration of identifying a next task to service. Performance of a first subtask of the newly assigned refTask may then be initiated, at 605.

Techniques and architectures for controlling DMA data transfers are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, embodiments are not described with reference to any particular programming language. It will be appreciated that a variety of programming languages may be used to implement the teachings of certain embodiments as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   with a sequence of masking logic of a direct memory access (DMA) engine, identifying a DMA task to service, the identifying according to a hierarchy of rules including:
      a first rule to identify a task assigned a priority greater than a reference priority;
      a second rule to identify a next task in a sequence of tasks assigned the reference priority;
      a third rule to identify a suspended task assigned a next priority less than the reference priority;
      a fourth rule to identify a skipped task assigned a next priority less than the reference priority; and
      a fifth rule to identify a next task in a sequence of tasks assigned a next priority less than the reference priority; and
   in response to the identifying the DMA task, providing to a data mover a signal indicating the identified DMA task.

2. The method of claim 1, wherein the sequence of masking logic includes:
   for each of a plurality of priorities, suspend masking logic masking one or more task requests associated with the priority, the masking by the suspend masking logic for the priority based on a suspending of a task assigned to the priority.

3. The method of claim 2, wherein the sequence of masking logic further includes:
   for each of the plurality of priorities, victim channel masking logic masking one or more task requests associated with the priority which are indicated by the suspend masking logic, the masking by the victim channel masking logic for the priority based on a skipping of a task assigned to the priority.

4. The method of claim 3, wherein the DMA engine includes:
   a priority arbiter identifying from one or more task requests indicated by the victim channel masking logic a set of one or more task requests associated with a highest priority indicated by the victim channel masking logic.

5. The method of claim 4, wherein the DMA engine includes:
   a round robin arbiter determining from the set of one or more task requests identified by the priority arbiter a task request for the DMA task to be serviced.

6. The method of claim 1, wherein the DMA task is identified by a result of a test for the first rule, the method further comprising:
   gracefully suspending a current DMA task before servicing the identified DMA task; and
   storing first state information to identify the current DMA as a suspended task.

7. The method of claim 6, the method further comprising:
   in response to identifying the DMA task, storing second state information identifying a first DMA task as being a victim task for a priority associated with the first DMA task, wherein the first DMA task is between the current DMA task and the identified DMA task in a portion of a round robin sequence.

8. An apparatus comprising:
   arbitration logic to identify a direct memory access (DMA) task to service, the identifying according to a hierarchy of rules including:
      a first rule to identify a task assigned a priority greater than the reference priority;
      a second rule to identify a next task in a sequence of tasks assigned the reference priority;
      a third rule to identify a suspended task assigned a next priority less than the reference priority;
      a fourth rule to identify a skipped task assigned a next priority less than the reference priority; and
      a fifth rule to identify a next task in a sequence of tasks assigned a next priority less than the reference priority; and
   a data mover coupled to the arbitration logic to receive, in response to the identifying the DMA task, a signal indicating the identified DMA task.

9. The apparatus of claim 8, wherein the arbitration logic includes:
   suspend masking logic, wherein for each of a plurality of priorities, the suspend masking logic to mask one or more task requests associated with the priority, the masking by the suspend masking logic for the priority based on a suspending of a task assigned to the priority.

10. The apparatus of claim 9, wherein the arbitration logic includes:
    victim channel masking logic to identify one or more task requests indicated by the suspend masking logic, wherein for each of the plurality of priorities, the victim channel masking logic to mask one or more task requests associated with the priority which are indicated by the suspend masking logic, the masking by the victim channel masking logic for the priority based on a skipping of a task assigned to the priority.

11. The apparatus of claim 10, wherein the arbitration logic includes:
    a priority arbiter to identify from one or more task requests indicated by the victim channel masking logic a set of one or more task requests associated with a highest priority indicated by the victim channel masking logic.

12. The apparatus of claim 11, wherein the arbitration logic includes:
    a round robin arbiter to determine from the set of one or more task requests identified by the priority arbiter the DMA task to be serviced.

13. The apparatus of claim 8, wherein the DMA task is identified by a result of a test for the first rule, the apparatus further comprising:
    a DMA engine interface responsive to the identifying the DMA task to gracefully suspend a current DMA task before a servicing of the identified DMA task; and
    a first channel module to store first state information to identify the current DMA as a suspended task, the storing the first state information responsive to the identifying the DMA task.

14. The apparatus of claim 13, the method further comprising:
- a second channel module to store second state information identifying a first DMA task as being a victim task for a priority associated with the first DMA task, the storing the second state information responsive to the identifying the DMA task, wherein the first DMA task is between the current DMA task and the identified DMA task in a portion of a round robin sequence.

15. The apparatus of claim 14, wherein while the first DMA task is identified as the victim task for the priority associated with the first DMA task, the arbitration logic further to prevent any other DMA task from being identified as another victim task for the priority associated with the first DMA task.

16. A computer-readable storage medium having stored thereon instructions which, when executed by one or more processors, cause the one or more processors to perform a method comprising:
- with a sequence of masking logic of a direct memory access (DMA) engine, identifying a DMA task to service, the identifying according to a hierarchy of rules including:
  - a first rule to identify a task assigned a priority greater than a reference priority;
  - a second rule to identify a next task in a sequence of tasks assigned the reference priority;
  - a third rule to identify a suspended task assigned a next priority less than the reference priority;
  - a fourth rule to identify a skipped task assigned a next priority less than the reference priority; and
  - a fifth rule to identify a next task in a sequence of tasks assigned a next priority less than the reference priority; and
- in response to the identifying the DMA task, providing to a data mover a signal indicating the identified DMA task.

17. The computer-readable storage medium of claim 16, wherein the sequence of masking logic includes:
- for each of a plurality of priorities, suspend masking logic masking one or more task requests associated with the priority, the masking by the suspend masking logic for the priority based on a suspending of a task assigned to the priority.

18. The computer-readable storage medium of claim 17, wherein the sequence of masking logic further includes:
- for each of the plurality of priorities, victim channel masking logic masking one or more task requests associated with the priority which are indicated by the suspend masking logic, the masking by the victim channel masking logic for the priority based on a skipping of a task assigned to the priority.

19. The computer-readable storage medium of claim 18, wherein the DMA engine includes:
- a priority arbiter identifying from one or more task requests indicated by the victim channel masking logic a set of one or more task requests associated with a highest priority indicated by the victim channel masking logic.

20. The computer-readable storage medium of claim 19, wherein the DMA engine includes:
- a round robin arbiter determining from the set of one or more task requests identified by the priority arbiter a task request for the DMA task to be serviced.

* * * * *